A. J. STEVENS.

PISTON-PACKING.

No. 7,781. Reissued July 3, 1877.

Witnesses

Geo. H. Strong

Owen J. Stacy

Inventor

A. J. Stevens by his attys

Dewey & Co

UNITED STATES PATENT OFFICE.

ANDREW J. STEVENS, OF SACRAMENTO, CALIFORNIA.

IMPROVEMENT IN PISTON-PACKING.

Specification forming part of Letters Patent No. 46,723, dated March 7, 1865; Reissue No. 7,781, dated July 3, 1877; application filed December 2, 1876.

*To all whom it may concern:*

Be it known that I, ANDREW J. STEVENS, of Sacramento, California, have invented a new and useful Improvement in Piston-Packing, of which the following is a specification:

My invention relates to certain improvements in pistons and the packing-rings which are employed to make a tight joint between the piston and the inside of the cylinder of a steam or other engine; and it consists in so constructing the packing-rings that they shall extend over the piston head and follower, so as to have a bearing the full length of the piston, thus increasing the efficiency of the packing, and serving to hold the piston steadily in the center of the cylinder.

Previous to my invention these rings have always been made to occupy the space between the piston-head and the follower, by which they are secured in place, being usually held out by elastic springs, and as the piston head and follower are made of a diameter slightly less than the interior diameter of the cylinder, the piston and rod are not rigidly retained in the center of the cylinder, but are subject to oscillation and an irregular wear, which is greatly increased in cylinders of large diameter, in which the piston has great weight, while the rings perform only the duty of maintaining a steam-tight joint, but with a comparatively narrow bearing.

My invention is intended to utilize the entire length of the piston as a surface of contact between the rings with the projecting flanges and the interior of the cylinder, including the piston head and follower, and also to cause the rings and flanges to retain the piston at all times in the center of the cylinder by the direct support which, with my construction, they give it from the outside. This I do by making the outer rings with extensions or flanges F, which project over the piston head and follower, so that their edges are flush with the ends of the piston. This enables me to guide the piston more securely, and prevent it from swinging or oscillating during the stroke, and it diminishes the wear between the frictional surfaces of the cylinder and piston.

Figure 1:
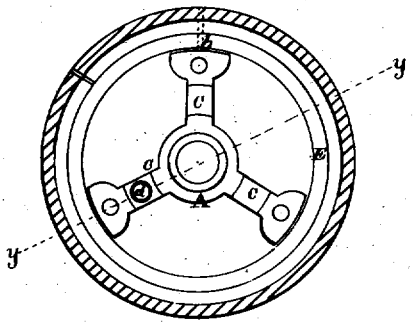
Figure 2:
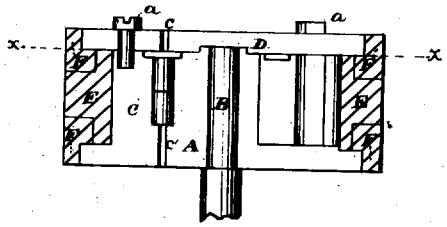
Figure 3:
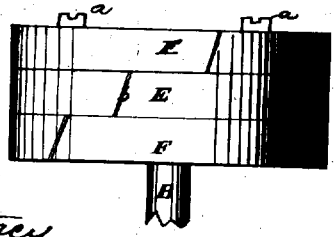

Referring to the accompanying drawings for a more complete explanation of my invention, Figure 1 is a section of my piston, taken through *x x*, Fig. 2, showing the follower removed. Fig. 2 is a section taken through *y y*, Fig. 1. Fig. 3 is a side or edge view of the piston.

A is the piston; B, the piston-rod, and D the follower, these parts being similar in construction to the form ordinarily used. C is a spider, consisting of radial arms, which are usually cast with the piston-head, having their outer ends turned off to receive the packing-rings.

The diameter of the spider being less than that of the head and follower, the ring E is turned so as to fit the spider, and just fills the space between the head and follower when the latter is secured in place by the bolts *a*, or other suitable means. The flanges F extend over the edges of the head A and follower D, so that the periphery or face of the rings is of the full depth of the piston, the piston-head and follower being turned considerably smaller than would be done where the ordinary rings are used, in order to allow the flanges F to overlap.

It will be seen that the piston is guided and kept firmly in the center of the cylinder by means of the ring. The bearing-surface between the piston and cylinder is extended to the full length of the piston, and the wear of the inner surface of the cylinder is greatly reduced.

In order to hold the rings closely against the inside of the cylinder, and make a tight joint, I prefer to use steam instead of springs, and this is allowed to enter the piston inside of the ring E, alternately from each end of the cylinder, through holes *c c'*. These holes are made in the arms of the spider, and serve to receive and guide the valves *d d'*, which act automatically; and while admitting the steam from either side to the interior of the piston, they prevent it from passing through to the opposite side.

Having thus described my invention, what I claim as new, and desire to secure by Letters Patent, is—

The piston or head A, with its spider C and follower D, in combination with the rings and flanges F, said flanges projecting over, and being supported by, the head A and follower D, substantially as and for the purpose herein described.

In witness whereof I have hereunto set my hand.

ANDREW JACKSON STEVENS.

Witnesses:

JOHN RAFFERTY.

BEN. SMITH.